(12) United States Patent
Lauper et al.

(10) Patent No.: US 6,973,203 B1
(45) Date of Patent: Dec. 6, 2005

(54) TRANSACTION METHOD AND SUITABLE DEVICE THEREFOR

(75) Inventors: Eric Lauper, Bern (CH); Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 10/031,340

(22) PCT Filed: Jul. 22, 1999

(86) PCT No.: PCT/CH99/00338

§ 371 (c)(1),
(2), (4) Date: Jan. 18, 2002

(87) PCT Pub. No.: WO01/08056

PCT Pub. Date: Feb. 1, 2001

(51) Int. Cl.[7] .............................................. G06K 9/00
(52) U.S. Cl. ...................... 382/117; 382/190; 382/305; 382/324; 707/10; 707/103 R; 713/186
(58) Field of Search ................ 382/115, 117, 151, 382/173, 274, 181, 190, 232, 266, 324, 255, 382/305; 707/10, 102, 201, 100, 101, 200, 707/103 R, 203; 713/186, 200; 235/380

(56) References Cited

U.S. PATENT DOCUMENTS

| | | | |
|---|---|---|---|
| 5,359,669 A | 10/1994 | Shanley et al. | 382/117 |
| 5,369,415 A | 11/1994 | Richard et al. | 345/6 |
| 5,659,327 A * | 8/1997 | Furness et al. | 345/8 |
| 6,639,570 B2 * | 10/2003 | Furness et al. | 345/8 |
| 6,651,880 B1 * | 11/2003 | Nakisa | 235/379 |
| 6,803,887 B1 * | 10/2004 | Lauper et al. | 345/9 |

FOREIGN PATENT DOCUMENTS

| | | |
|---|---|---|
| WO | 98 09227 | 3/1998 |
| WO | 98 10361 | 3/1998 |

* cited by examiner

*Primary Examiner*—Kanjibhai Patel
*Assistant Examiner*—Sheela Chawan
(74) *Attorney, Agent, or Firm*—Oblon, Spivak, McClelland, Maier & Neustadt, P.C.

(57) ABSTRACT

A transaction method, a service center, and a device for carrying out the transaction method. In the transaction method object picture data relating to a transaction object, for example a product or a service, are made visible to a user, for instance by projecting image signals corresponding to the object picture data directly on the retina of the user. Eye features of the user are determined while the object picture data, made visible, are viewed by him/her, for example by the light being captured that is reflected by the retina owing to the projected image signals and retina patterns of the user being determined from the determined reflection data and the associated object picture data. The determined eye features with object data relating to the transaction object are linked in a transaction record and the transaction record is forwarded to a processing unit.

17 Claims, 2 Drawing Sheets

TRANSACTION METHOD AND SUITABLE DEVICE THEREFOR

Figure 1:
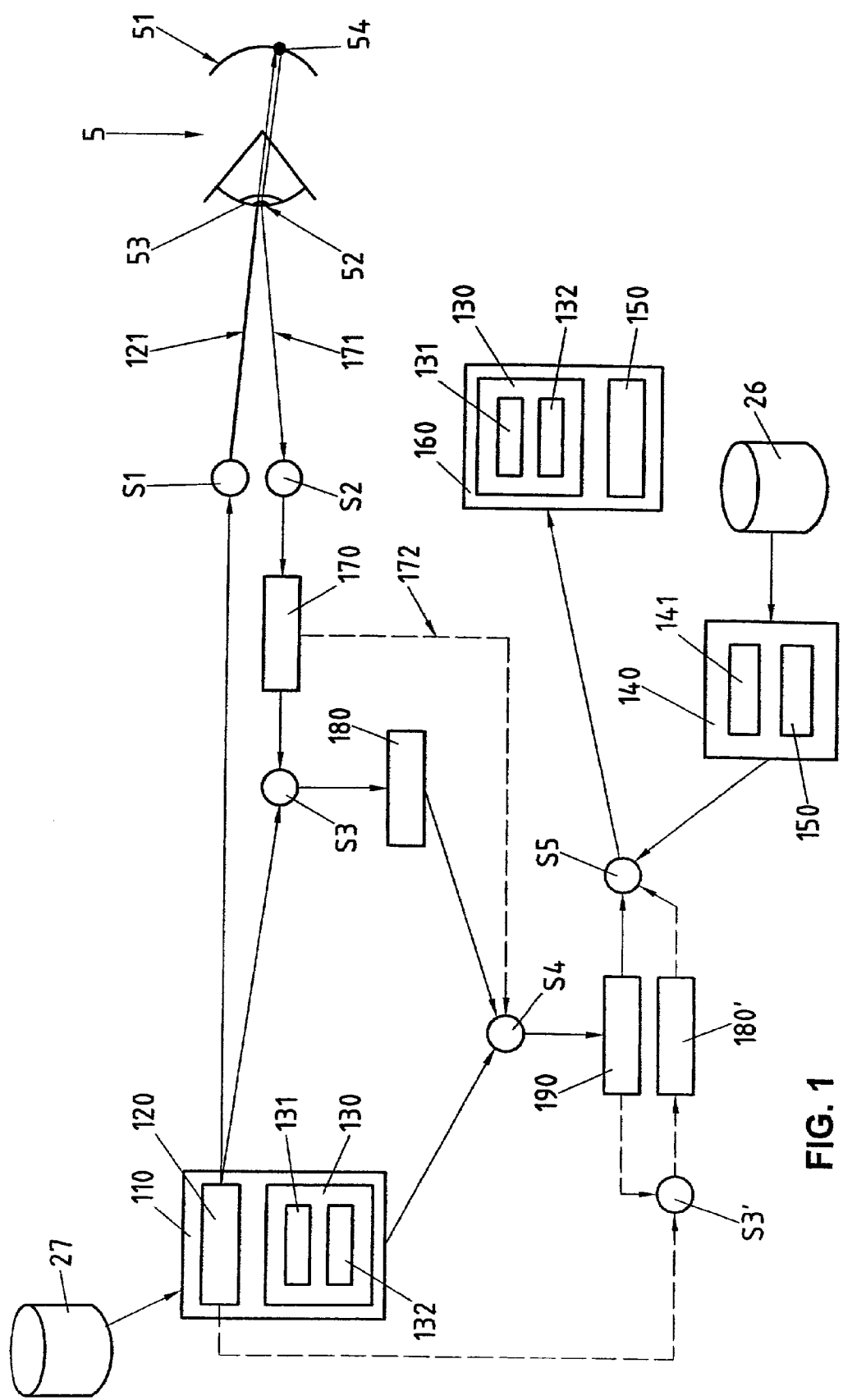

The present invention relates to a transaction method and devices suitable therefor. In particular, the present invention relates to a transaction method and devices suitable therefor in which transaction method data for identification of a user are linked in a transaction record to an object identification for a transaction object, for example a product or a service, and the transaction record is transmitted to a processing unit.

In known transaction methods involving a user, for example ordering transaction methods in which customers transmit orders for products and/or services to a service center, the user typically has to identify himself with an identification module, for instance a credit card, a customer card or an SIM card (Subscriber Identification Module), and/or with a personal code (password, PIN number). The drawback of these methods is that the identification modules can be lost or stolen, so that even if use by unauthorized persons is made more difficult through the additional personal code, the problem nevertheless still exists that a respective user is not able to correctly identify himself again until he has received a replacement module. Moreover many users are finding it difficult to carry around with them the continuously growing number of identification modules and to remember the personal codes belonging thereto.

Described in the patent publication U.S. Pat. No. 5,359,669 is a scanner which can be operated in alternative modes such that it captures the retina pattern of a user in a first mode and projects pictures on the retina for the user in a second mode. According to U.S. Pat. No. 5,359,669, the captured retinal pattern is transmitted to a remote unit for identification purposes, whereby a secured communications system can be achieved.

Described in the patent application WO 98/09227 is a method and a system for carrying out transactions in which a biometric feature of a user, in particular a retinal pattern, is captured, after the user has been offered a transaction object by the vendor. According to WO 98/09227, the captured biometric feature of the user is transmitted in a transaction record to a computer system. The user is identified in the computer system on the basis of the received biometric feature, and, in the case of positive identification, the transaction is carried out.

It is an object of this invention to propose a new and better transaction method involving a user as well as devices suitable therefor which, in particular, do not have the mentioned drawbacks.

According to the invention, this object is achieved in particular through the elements of the independent claims. Further advantageous embodiments follow moreover from the dependent claims and from the description.

This object is achieved through the present invention in particular in that object picture data relating to a transaction object, for example a product or a service, are made visible to a respective user, eye features of the user are determined while the object picture data, made visible, are viewed by the user, and the determined eye features are linked in a transaction record to object data relating to the transaction object and containing at least an object identification, which transaction record can then be forwarded to a processing unit. The advantage of this transaction method consists in that eye features are used as biometric identification means, and thus no conventional identification module has to be carried around anymore by the user and no additional personal codes have to be remembered. The object picture data make it possible moreover for the user to visualize the respective transaction object, for example in the form of two or three-dimensional pictures, in the form of a graphic, in the form of a written text or by means of a combination of these different forms.

In a preferred embodiment variant, the object picture data are made visible to the user by picture signals corresponding to these object picture data being projected directly on the retina of the user. Depending upon the embodiment, picture signals can be projected on the retina of one eye or on the retina of both eyes, the projection on the retina of both eyes being advantageous for spatial (three-dimensional) illustrations and making possible stereoscopic perception.

The eye features are preferably determined in that light reflected by eye parts, for example the iris or the retina, is captured from at least a partial region of these eye parts and transmitted to a light-sensitive element. Depending upon the embodiment variant, there exists the possibility of capturing eye features of eye parts of both eyes or of only one eye.

In a preferred embodiment variant, the eye features include at least the retinal pattern for one retina of the respective user, the retinal pattern being determined from the determined reflection data and the associated object picture data, in particular by means of a subtraction operation, the reflection data being determined from captured light, which light is reflected by the retina on the basis of the projected picture signals corresponding to the object picture data. This embodiment variant has the advantage that, in an inseparable step ("atomic function"), the data for identification of a user result during the viewing by the user of the picture data, made visible, for the transaction object. The determined reflection data namely represent an (optical) linking of the picture data for the transaction object, which are projected directly on the retina of the user by means of corresponding picture signals, and the retinal pattern (or patterns) of this user. The determination of the actual retinal pattern from the reflection data be carried out in a processing unit that is located in a local, e.g. mobile, device with the user or in a service center remote from the user. In the latter case, the transaction records are transmitted to a processing unit of this service center via a telecommunications network, for example a fixed network or a mobile network, for instance a GSM or a UMTS or another, e.g. satellite-based, mobile radio network. In corresponding embodiment variants, the object picture data are obtained from a service center via a telecommunications network, for example a fixed or a mobile radio network, for instance a GSM or a UMTS or another, e.g. satellite-based, mobile radio network.

For further processing of the transaction record, user data are preferably determined in the processing unit which are associated with the eye features, these user data containing, for example, the name, the delivery address, a billing mode and, if applicable, a billing address and possible further data relating to the user.

In an embodiment variant, the object data contain in addition an object provider identification. This has the advantage that the transaction record contains not only data for identification of a respective user and a respective transaction object, but also identifies at the same time the service provider responsible for the transaction object, for example the service provider from whom a product or a service can be obtained or who is responsible for the financial transaction that has been made visual for the user by means of the corresponding object picture data, so that the object identification for the transaction object and user data relating to the interested user can be passed on to this service provider, for instance as an object order or as a financial transaction.

Besides the transaction method according to the invention, the present invention also relates in particular to a device and a service center for carrying out this transaction method.

Figure 2:
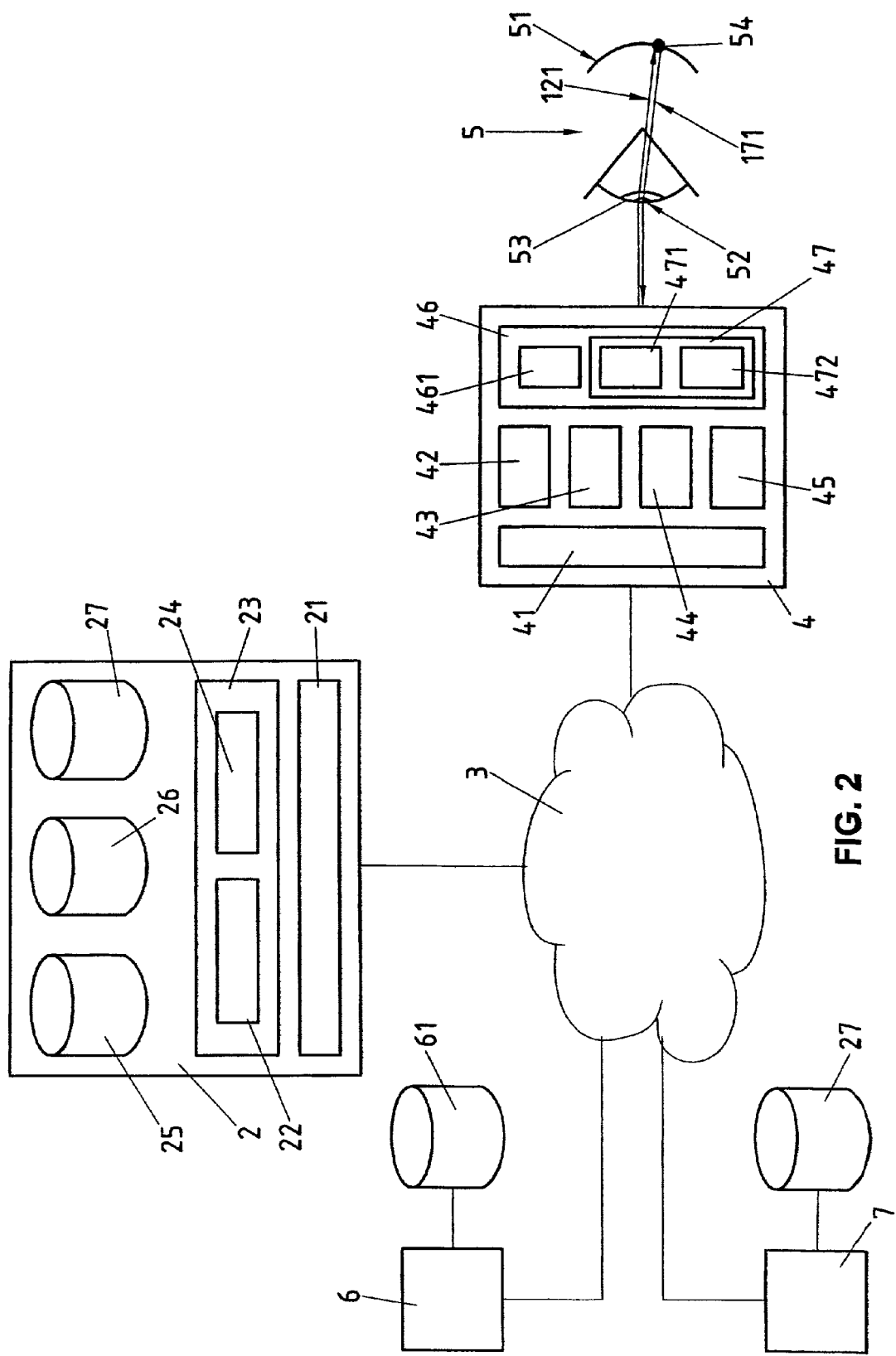

An embodiment of the present invention will be described in the following with reference to an example. The example of the embodiment is illustrated by the following attached figures:

FIG. 1 shows a data flow chart in which a possible data/signal flow of the transaction method according to the invention is illustrated diagrammatically, and FIG. 2 shows a block diagram in which illustrated schematically are a device and a service center connected to this device via a telecommunications network for carrying out the transaction method according to the invention.

The reference numeral 110 in FIG. 1 refers to a transaction object which is stored in an object database 27 and which contains data about objects such as products or services. The transaction object 110 contains object data 130 that include an object identification 131 and an object provider identification 132, the object provider identification 132 identifying the provider of the respective product, or the service provider for the respective service. The transaction object 110 contains in addition object picture data 120, i.e. a file with digital, e.g. compressed, picture data relating to a transaction object 110, for instance a picture of a product offered for sale or an explanatory graphic about an offered service, and which can be made visible to an interested user, for instance in the form of a two- or three-dimensional picture, in the form of a graphic, in the form of a written text or as a combination of these different forms as moving (video) or still pictures. In a variant, the picture data also contain in addition audio data (multimedia data), which can be reproduced for the interested user by means of suitable electro-acoustical converters.

Via a telecommunications network 3, for example a fixed network or a mobile network, for instance a GSM, UMTS or another, e.g. satellite-based, mobile radio network, a user of the device 4 can obtain transaction objects 110 from an object database 27 of a service center 2, or directly from an object database 27 of an object provider 7, or respectively of a service provider 7, for example by means of a suitable browser, for instance a WAP (Wireless Application Protocol)-based browser, or another suitable programmed software module, and with the aid of a communications module 41, as illustrated in FIG. 2. Transaction objects 110 on a removable data carrier, for instance a CD ROM, can also be loaded into the device 4, however. The communications module 41 includes all hardware and software components to be able to communicate with other units via the telecommunications network 3, i.e. especially to exchange data. The communications module 41 is designed for a fixed or mobile network depending upon whether the device 4 is designed as a fixed-installed device, for instance in the form of a terminal accessible to the public, or as a mobile device.

As shown in FIG. 1, in step S1, the object picture data 120 are taken from a received transaction object 110, and picture signals 121 corresponding to the object picture data are projected directly on the retina 51 of the user, picture signals 121 being projected on the retina 51 of one or both eyes 5 of the respective user, depending upon the embodiment. For this purpose, the device 4 includes a (virtual) retinal display device 46, as is shown in FIG. 2.

A virtual retinal display device (Virtual Retinal Display, VRD), which is able to project picture signals directly on the retina 51 of a viewer, has been described, for example, in the patent applications WO 94/09472, WO 97/37339 and WO 98/13720. Via a video interface, these virtual retinal display devices can be supplied with picture data, for example in the form of an RGB signal, an NTSC signal, a VGA signal or another formatted color or monochrome video or graphic signal. One skilled in the art will understand that it can be advantageous to adapt the virtual retinal display device described in the mentioned patent publications WO 94/09472, WO 97/37339, and WO 98/13720, or respectively the video interface described there, in such a way that other formats of picture data can be received efficiently. By means of an interface module (not shown), however, received object picture data can also be suitably adapted to the video interface, or respectively received object picture data 120 can be converted in such that they can be applied to the video interface and be made visible to the user by means of the virtual retinal display device 46.

As shown schematically in FIG. 2, the virtual retinal display device 46 includes an eye position determining module 461, which can determine current eye positions of the user during the viewing of pictures. An eye position determining module (eye tracker) which can determine current eye positions based on the position of the pupil 52 of a viewer has also been described in the above-mentioned patent application WO 94/09472, and can be extended by one skilled in the art such that the determined eye position is available for other components of the device 4 via a suitable interface, in particular components situated outside the virtual retinal display device 46; depending upon the embodiment, values for both eyes can be made available. Determined current eye positions can be used, for instance, to control the projection of the picture signals 121 on the retina 51, for example such that the picture regions viewed by the user come to lie on the region of the retina with the highest resolution, the fovea centralis, or they can be compared with predefined position values, and in the case of agreement between current and predefined eye positions, predefined functions can be carried out so that an actual optical user interface controllable through eye positions can be defined, the predefined positions being able to be shown to the user pictorially, for instance in the form of conventional GUI objects (Graphical User Interface).

In step S2, in FIG. 1, the light 171 reflected on the basis of the above-mentioned picture signals 121 on the retina 51 is captured, and reflection data 170 is generated from the registered light values. As is shown in FIG. 2, the device 4 includes for this purpose a suitable scanner 47, which conducts the light reflected by the retina 51 to (at least) one light-sensitive element 472, for instance by means of a beam splitter 471. Such a scanner, which can also be designed for multicolored pictures and is suitable for recording retinal patterns, in particular patterns formed by the veins, has been described, for instance, in the above-mentioned patent application WO 98/13720. Since the picture signals corresponding to the object picture data 120 are projected on the retina 51 by the virtual retinal display device 46, for example by a suitable mirror, movable microelectro-mechanically, in a grid of picture points 54, the reflected light beams 171 conducted via the beam splitter 471 to the (at least one) light-sensitive element 472 correspond to the same grid of reflected picture points 54, so that associated reflection data 170 corresponding to the object picture data 120 can be captured.

The light values registered in the light-sensitive element(s) 472 are digitalized, for instance in the data creating module 45, and, in step S3, the retinal pattern 180 is generated from the reflection data 170 thus obtained and from the corresponding associated object picture data 120, as shown in FIG. 1, in particular by means of a subtraction operation. Step S3 can be carried out sequentially for each projected/reflected picture point 54 or not until reflection data 170 exist for all projected/reflected picture points 54. The data creating module 45 is, for example, a programmed software module implemented on a processor of the device 4 or a hardware module, for instance an integrated circuit, or a combination of the two. In a variant, the retinal patterns 180 are only generated, for example, if the user has indicated to the device 4, by means of a signal, e.g. by means of an operating element (not shown) or through eye positioning via the above-mentioned optical interface, that he would like to initiate a transaction for the respective transaction object 110, made visible, i.e. he would like to request the respective product or the respective service, for example. Shown schematically in FIG. 2 is the retina determining module 44, responsible for determining the retinal pattern 180, which module is executed as a programmed software module on a processor of the device 4 or in hardware form, for instance as an integrated circuit. Dealt with later will be an alternative embodiment variant in which determination of the retinal pattern 180' is carried out in the service center 2. It should be mentioned here that in this preferred embodiment example only retinal patterns have been mentioned as captured eye features, but patterns of the iris could also be captured instead (independently of the object picture data).

It is also possible to use a separate light source for determining the retinal pattern, for instance an LED (Light Emitting Diode) or a laser, whose light beams are projected on the retina 51 as a grid of picture points 54, for instance by means of suitable, microelectro-mechanically movable mirrors. In this way the captured reflection data 170 (which reflection data, as mentioned above, is obtained from the reflected light beams 171, e.g. by conducting them to a light-sensitive element 472 via a beam splitter 471 and of digitalizing them in the data creating module 45) correspond to the retinal pattern, it being possible for this direct capturing of the retinal pattern to take place during the simultaneous viewing of the picture data 120 by the user if the separate light source radiates light containing other wavelengths than the picture signals 121 corresponding to the picture data 120, for instance if this light source is an infrared light source, and if the light-sensitive element 472 used is correspondingly designed for this light.

One skilled in the art will understand that, in the sense of the present invention, the components used for the virtual retinal display device 46 and for the scanner 47, such as, for example, pivotable or rotatable microelectro-mechanical mirrors, light sources or light-sensitive elements, can be combined in different embodiment variants of the display device 46 and of the scanner 47, or separate components can be used in each case for the display device 46 and for the scanner 47. It is also possible for individual components, for instance an LED light source and a light-sensitive element, to be replaced by components with combined functions.

In step S4, the determined retinal patterns 180 are linked in a transaction record 190 with the object data 130 for the respective transaction object 110, made visible, as is shown in FIG. 1. The object data 130 contain at least an object identification 131; they can also contain in addition an object provider identification 132, however. Shown schematically in FIG. 2 is the transaction module 42 responsible for this operation. The transaction module 42 is implemented, for example, as a programmed software module on a processor of the device 4 or in hardware form, e.g. as an integrated circuit. The transaction module 42 also includes, for example, additional cryptographic functions, for electronically (digitally) signing the transaction record 190, for instance. Further customary functions, such as insertion of transaction numbers, can also be undertaken by the transaction module 42.

The transaction records 190 are passed on to a processing unit 23, 43 in step S5 for further processing. Shown schematically in FIG. 2 are two different variants for the implementation of this processing unit 23, 43. In a first preferred variant, the processing unit 23 is located in the service center 2, and the transaction records 190 are transmitted to the service center 2 over the telecommunications network 3 by means of the communications module 41 of the device 4, and are received there by the communications module 21 and passed on to the processing unit 23. In a second variant, the processing unit 43 is located in the device 4, so that step S5, shown in FIG. 1, can be carried out locally in the device 4.

Taken from the transaction record 190 in step S5 are the retinal patterns 180, 180' contained therein, according to FIG. 1, and they are compared with retinal patterns 141 of user data records 140 from a user database 26 in order to determine the user data 150 associated with the respective user in the case of a match. Depending upon the embodiment, the retinal patterns can be stored, together with an associated user identification for the respective user, in a separate eye feature database 61, in particular a retina database, which is certified by a TTP unit 6 (Trusted Third Party), for instance, so that first the user identification is determined and then the user data associated with this user identification are obtained from a user database 26, which is administered, for example, by another unit, e.g. a telecommunications network operator. In the above-mentioned variant with the local processing unit 43, the device contains, for instance, local tables with user data records 140. It should be mentioned here that there can be agreement with a predefined minimal required correlation value between the retinal patterns 180, 180' contained in the transaction records 190 and the stored retinal patterns 141 from the user database 26, or respectively from a retina database or a local table in the device 4. To carry out the comparison, the processing unit 23, 43 can also include picture processing functions, said processing unit being implemented in the service center 2, as a programmed software module on a processor of the service center 2, or respectively implemented in the device 4, on a processor of the device 4, or in hardware form, e.g. as an integrated circuit.

As illustrated in FIG. 1, resulting from step S5 is a transaction data record 160 containing the transmitted object data 130 with the object identification 131 and, if applicable, the object provider identification 132, as well as the determined user data 150. The user data 150 contain, for instance, the name of the user identified through the retinal pattern 180, 180', 141, his delivery address, if applicable a payment mode and related payment data, for example payment by credit card and related credit card number or payment via bank account and related billing address, and possibly further indications about the user, for instance his preferred language.

The receipt of the transaction record 190, and if applicable the successful identification of the user on the basis of the eye features 180, 180' contained in the transaction record 190 can be confirmed to the user by the processing unit 23, 43, for example, and, depending upon the embodiment, the user can be given the possibility of continuing or stopping further processing of the transaction. The transaction data records 160 resulting from step S5 can be passed on by the processing unit 43 in the device 4, or respectively by the programmed forwarding module 22 in the service center 2, to the responsible units, for instance the transaction data records 160 can be transmitted over the telecommunications network 3 to the responsible object provider 7, or respectively service provider 7, where they are further processed without further participation of the service center 2 or the device 4, for example. To pass on the transaction data records 160 to respective object providers 7 identified by the object provider identification 132, the device 4 contains, for instance, tables with object provider data and the service center 2 includes an object provider database or respectively a service provider database 25.

As already mentioned above, in an alternative embodiment variant, the determination of the retinal pattern 180' from the reflection data 170 and the associated object picture data 120 can be carried out in the service center 2. This variant is illustrated in FIG. 1 by the broken lines. The arrow with broken line 172 indicates that the captured reflection data 170 are sent on directly to step S4 (without carrying out step S3), and are linked together there with the object data 130 in a transaction record 190. In the alternative step S3', which is carried out in the retina determining module 24 of the service center 2, according to FIG. 2, the retinal pattern 180' is generated from the reflection data 170, contained in the transaction record 190, and the associated object picture data 120, identified by the object identification 131 contained in the transaction record 190, in particular by means of a subtraction operation, and is passed on to the processing unit 23 for execution of step S5. The retina determining module 24 is, for example, a programmed software module implemented on a processor of the service center 2, or a hardware module, for instance an integrated circuit, or a combination of the two.

The service center 2 is implemented on one or more (networked) computers, and has in the communications module 21 all hardware and software components for communicating with other units over the telecommunications network 3, i.e. in particular for exchanging data, whereby it is to be mentioned that the telecommunications network 3 is shown only schematically in FIG. 2 and can comprise, for example, various types of telecommunications networks, for instance fixed networks, e.g. the public switched telephone network, an ISDN network (Integrated Services Digital Network) or an IP network (Internet Protocol), and mobile networks, for instance GSM, UMTS or other, e.g. satellite-based, mobile radio networks.

The components of the device 4 can be integrated into a common housing. They can also be implemented in different housings connected to one another. For example, the communications module 41 in particular can be achieved through an already existing conventional communications terminal, for instance a communication-capable personal computer or in particular a mobile radio device, e.g. a mobile radio telephone or a communication-capable palm-top or laptop computer, which is connected to the other components of the device 4 via a wired or wireless interface. These other components of the device 4 can be designed, for example, in a housing or on a suitable carrier such that they are able to be put on by the user like conventional spectacles. It should be mentioned here furthermore that in particular the components of the virtual retinal display device 46 with the scanner 47, but also, for instance, the transaction module 42, the retina determining module 44 and the data creating module 45 can be integrated on a common chip so that the steps S1, S2, S3 and S4 indicated in the figure can be executed by components of a single chip, which has in particular security advantages since the data records can be processed in a single chip in a way that cannot be manipulated and the resulting transaction record 190 can also be signed in this chip (electronically), for instance.

It should be stated here that, as already mentioned, the eye features need not be merely retinal patterns 180, 180', but can also be features of other eye parts, for instance patterns of the iris 53, and the object picture data 120 can be made visible not only through direct projection of corresponding picture signals 121 on the retina 51 of the user, but instead this can also be achieved through other conventional display methods, for example by means of picture tubes, LCD displays or other suitable stereoscopic displays. It should also be mentioned that other usual features in transaction methods such as, for example, encryption/decryption of data transmitted over telecommunications networks 3, authentication of the service center 2 and of other units taking part in the transaction, or protocols for order confirmation, billing or back-up/recovery procedures have not been gone into in detail in this description since these can be achieved by one skilled in the art in a known way.

Besides the sale or the leasing of described service centers 2 and/or fixed-installed devices 4 to interested operators and of described (in particular mobile) devices 4 to interested users, partial modules can also be sold to interested users, in particular the above-mentioned components which are implemented in a housing or on a suitable carrier and are able to be connected via a suitable interface to a conventional, already available communications terminal in order to extend the already available communications terminal to a described device 4. Furthermore the above-mentioned chips for producing devices 4 or the described partial modules can be sold to interested manufacturers. Operators of a service center 2 can be charged a fee, for example, by an object provider for each transaction made via their service center 2 relating to a transaction object 110 of this object provider 7.

LIST OF REFERENCE NUMERALS 2 service center
3 telecommunications network
4 device
5 eye
6 TTP unit (Trusted Third Party)
7 object provider (service provider)
14 user database
21 communications module
22 forwarding module
23 processing unit
24 retina determining module
25 object provider (service provider) database
26 user database
27 object database
41 communications module
42 transactions module
43 processing unit
44 retina determining module
45 data creation module
46 virtual retinal display device
47 scanner
51 retina
52 pupil
53 iris
54 projected/reflected picture point
61 eye feature database (retina database)
110 transaction object
120 object picture data 121 picture signals
130 object data
131 object identification
132 object provider identification
140 user data record
141 retina pattern
150 user data
160 transaction data record
170 reflection data
171 reflected light
172 arrow with broken line
180, 180' retina pattern
190 transaction record
461 eye position determining module
471 beam splitter
472 light-sensitive element
S1–S5 steps

What is claimed is:

1. A transaction method in which object picture data relating to a transaction object are made visible to a user, in which eye features of the user are determined and in which the determined eye features are linked in a transaction record to object data relating to the transaction object and containing at least an object identification of the transaction object, and the transaction record is transmitted to a processing unit, wherein
the eye features of the user are determined while the object picture data, made visible, is being viewed by the user.

2. The transaction method according to claim 1, wherein the object picture data are made visible to the user by picture signals corresponding to the object picture data being projected directly on a retina of the user.

3. The transaction method according to claim 2, wherein the eye features include at least a retinal pattern of one retina of the user, reflection data are determined from captured light, which light is reflected by the retina based on the projected picture signals, and the retinal pattern is determined from the determined reflection data and associated object picture data.

4. The transaction method according to claim 2, wherein the features include at least a retinal pattern of one retina of the user, which retinal pattern is determined from captured light, which light is reflected by the retina based on projected light, which projected light contains other wavelengths than the picture signals.

5. The transaction method according to claim 2, wherein determined in the processing unit are user data, which are associated with the eye features.

6. The transaction method according to claim 1, wherein the eye features are determined by light reflected by eye parts being captured in at least a partial region of these eye parts and being conducted to a light-sensitive element.

7. The transaction method according to claim 1, wherein the object data further contain an object provider identification.

8. The transaction method according to claim 1, wherein the transaction records are transmitted by a telecommunications network to a processing unit in a service center.

9. The transaction method according to claim 1, wherein the object picture data are obtained from a service center over a telecommunications network.

10. A device having display means to make visible to a user object picture data relating to a transaction object, which device includes means for determining eye features of the user and includes means of linking in a transaction record the determined eye features with object data relating to the transaction object, the object data containing at least an object identification, and of forwarding the transaction record to a processing unit, wherein
the device is configured such that the eye features are determined while the object picture data, made visible, are being viewed by the user.

11. The device according to claim 10, wherein the display means include a retinal display device, which retinal display device makes visible to the user the object picture data by projecting picture signals corresponding to the object picture data directly on a retina of the user.

12. The device according to claim 10, wherein the means for determining eye features include a scanner to capture light reflected by eye parts at least in a partial region of these eye parts.

13. The device according to claim 12, wherein the scanner is configured to capture at least the light reflected by one retina of the user, which light is reflected by the retina based on projected picture signals, and the device includes a retina determining module to determine at least a retinal pattern of one retina from captured reflection data corresponding to the captured light and from associated object picture data.

14. The device according to claim 12, wherein the scanner includes a light source, which light source beams light containing other wavelengths than the picture signals, and the scanner is configured to capture at least the light reflected by one retina of the user, which light is reflected by the retina based on projected light from a light source.

15. The device according to claim 10, further comprising a processing unit, which processing unit determines user data which are associated with the eye features.

16. The device according to claim 10, further comprising a communications module to transmit the transaction record by a telecommunications network to a processing unit in a service center.

17. The device according to claim 16, wherein the communications module obtains the object picture data from a service center by a telecommunications network.

* * * * *